Figure 1:
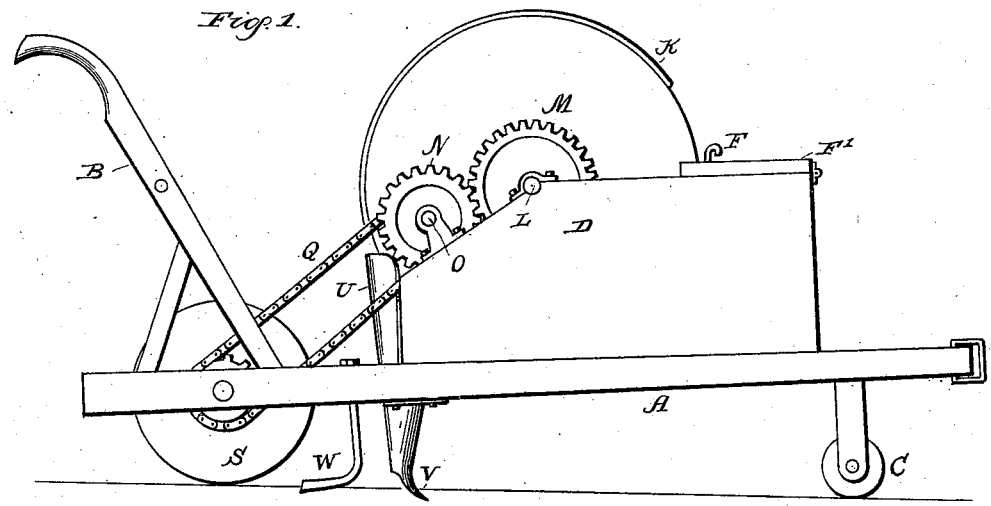

(No Model.)

A. T. STEWART.
SEED PLANTER.

No. 603,213.　　　　　　　　　Patented Apr. 26, 1898.

Witnesses
Victor J. Evans.
J. H. Tappan

Inventor
Alexander T. Stewart.
by John Wedderburn
Attorney

UNITED STATES PATENT OFFICE.

ALEXANDER T. STEWART, OF REAM'S STATION, VIRGINIA.

SEED-PLANTER.

SPECIFICATION forming part of Letters Patent No. 603,213, dated April 26, 1898.

Application filed August 21, 1896. Serial No. 603,513. (No model.)

*To all whom it may concern:*

Be it known that I, ALEXANDER T. STEWART, a subject of the Queen of Great Britain, residing at Ream's Station, in the county of Dinwiddie and State of Virginia, have invented certain new and useful Improvements in Seed-Planters; and I do hereby declare the following to be a full, clear, and exact description of the invention, such as will enable others skilled in the art to which it appertains to make and use the same.

This invention relates to certain new and useful improvements in seed planters or droppers; and it has for its objects, among others, to provide a simple and cheap device for this purpose by which the seed will be evenly and accurately planted and by which the same machine can be adapted for planting peanuts, corn, beans, peas, and other seeds and the distance apart easily regulated by simply placing another wheel in position.

Other objects and advantages of the invention will hereinafter appear, and the novel features thereof will be specifically defined by the appended claims.

The invention in this instance resides in the peculiar combinations and the construction, arrangement, and adaptation of parts, all as more fully hereinafter described, shown in the drawings, and then particularly pointed out in the claims.

The invention is clearly illustrated in the accompanying drawings, which, with the letters of reference marked thereon, form a part of this specification, and in which—

Figure 2:
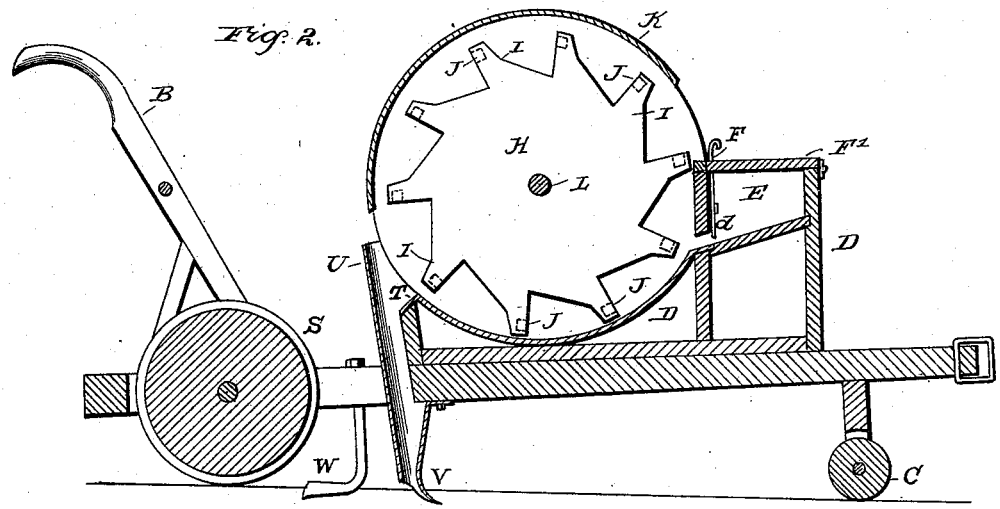
Figure 3:
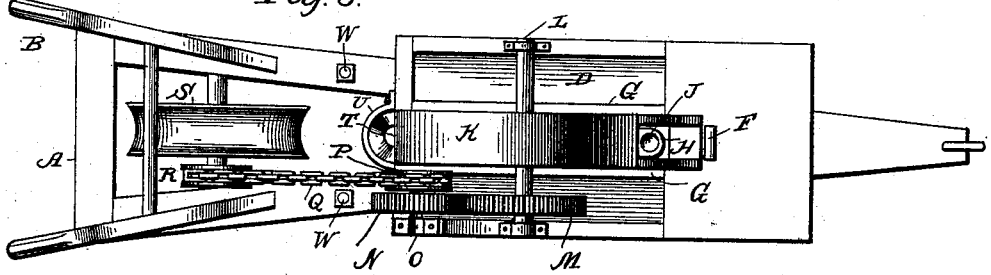

Figure 1 is a side elevation of my improved planter. Fig. 2 is a central vertical longitudinal section through the same. Fig. 3 is a top plan.

Like letters of reference indicate like parts throughout the several views.

Referring now to the details of the drawings by letter, A designates the frame, B the handles, and C the front guide-wheel, all of well-known construction.

Upon the frame is supported the box D, which at one end is formed with the compartment or seedbox E, in the rear wall of which is a feed-opening $d$, through which the seed are allowed to pass, and this opening is regulated by a slide F, by means of which the opening may be adjusted in accordance with the size and character of the seed being planted. This seedbox should be provided with a suitable cover F'.

The portion of the box D in rear of the seed-compartment is inclined upon the bottom and is provided with the partitions G, as shown, which form a central compartment or chamber within which the planter-wheel is designed to revolve. This wheel H is formed with the arms or fingers I, in each of which is formed a cup or depression J to receive the seed. This wheel is mounted to revolve so that these cups come opposite the feed-opening in the front wall of the seedbox and take up a seed each time they pass the same. I propose to make wheels having cups of different sizes to be made interchangeable, so that the wheel may be changed in accordance with the character of the seed being planted. This wheel is preferably covered with a suitable semicircular cover or shield K, as shown. It is revolved in the following manner: On the shaft L thereof, which is mounted in suitable bearings on the side walls of the box, is a gear-wheel M, which is designed to mesh with the small gear-wheel N on the stub-shaft O, and on which is a sprocket-wheel P, over which passes the sprocket-chain Q, which passes also over the sprocket-wheel R on the shaft of the coverer S. This coverer is fast upon its axle and is caused to revolve by engagement with the ground over which it passes.

At the discharge-opening of the compartment in which the planter-wheel works is a spout T, into which the seed are delivered as the arms of the wheel approach the same, and from this spout the seed fall into the shoe U and to the ground. The coverer-wheel will cover the seed as it falls into the furrow made by the shovel V on the lower front end of the shoe, with scrapers in front of wheel to cover seed as it drops from shoe W.

The operation will be readily understood from the foregoing description when taken in connection with the annexed drawings, and a further detailed description thereof is deemed unnecessary.

What is claimed as new is—

1. The seed-planter herein described, comprising the frame and handles, the front guide-wheel, the box on said frame having at one end a compartment with a feed-opening in its rear wall, a slide controlling said opening, the portion of said box in rear of the seed-compartment having inclined bottom below the axis of the planter-wheel and provided with vertical longitudinal partitions, a hinged cover to said box and carrying said slide, a planter-wheel formed with fingers having depressions and mounted to revolve between said partitions, a semicircular cover for said wheel, a coverer-wheel and connections substantially as described between the same and the shaft of the seed-distributing wheel, all substantially as herein shown and described.

2. In a seed-planter of the character described, the combination with the frame, the supporting-wheels and the planter-wheel and the feed-box, of a shoe having its upper end extended upward to a point above the lower edge of said wheel with an inclined spout communicating therewith, a curved bottom to the compartment in which the planter-wheel revolves, said bottom having one edge turned downward and rearward, and secured to a fixed portion of the frame to constitute the upper end of said shoe, a shovel on the lower free end of the shoe, and scrapers carried by the frame to the rear of said shoe, all substantially as herein shown and described.

In testimony whereof I have signed this specification in the presence of two subscribing witnesses.

A. T. STEWART.

Witnesses:
M. J. STEWART,
R. O. GILLIAM.